United States Patent [19]

Youngblood

[11] Patent Number: 5,328,254
[45] Date of Patent: Jul. 12, 1994

[54] METHOD AND SYSTEM FOR CONTROLLING BRAKE PRESSURE UNDER LOW MU BRAKING SURFACE CONDITIONS IN A VEHICULAR ABS

[75] Inventor: Richard J. Youngblood, Battle Creek, Mich.

[73] Assignee: Eaton Corporation, Cleveland, Ohio

[21] Appl. No.: 875,996

[22] Filed: Apr. 29, 1992

[51] Int. Cl.$^5$ ............................................. B60T 8/58
[52] U.S. Cl. .................................... 303/100; 303/103; 303/109; 303/110
[58] Field of Search .................. 303/93, 94, 95, 96, 303/100, 103, 109, 110, 111, 113.1, 9.62, 113.5; 364/426.01, 426.02, 426.03

[56] References Cited

U.S. PATENT DOCUMENTS

| | | | |
|---|---|---|---|
| 3,840,278 | 10/1974 | Fleischer et al. | 303/111 X |
| 4,702,337 | 10/1987 | Burckhardt et al. | 303/93 X |
| 4,768,840 | 9/1988 | Sullivan et al. | 303/100 X |
| 4,787,683 | 11/1988 | Singleton | 303/110 |
| 4,818,035 | 4/1989 | McNich, Jr. | 303/9.69 X |
| 4,862,025 | 8/1989 | Dierker, Jr. et al. | 310/114 |
| 4,863,221 | 9/1989 | McNinch, Jr. | 303/94 |
| 4,881,784 | 11/1989 | Leppek | 303/110 X |
| 5,065,327 | 11/1991 | Yahagi et al. | 303/93 X |
| 5,071,200 | 12/1991 | McNinch, Jr. | 303/110 |
| 5,104,204 | 4/1992 | Naito et al. | 303/110 X |
| 5,116,108 | 5/1992 | Sigl et al. | 303/103 |
| 5,116,109 | 5/1992 | Kuwana et al. | 303/109 |
| 5,125,723 | 6/1992 | Sakuma et al. | 303/100 |
| 5,150,299 | 9/1992 | Fujioka | 303/103 X |

FOREIGN PATENT DOCUMENTS

| | | | |
|---|---|---|---|
| 2314847 | 1/1977 | France | 303/110 |
| 48-41173 | 6/1973 | Japan . | |
| 2171161 | 8/1986 | United Kingdom . | |
| 2229503 | 9/1990 | United Kingdom . | |
| 2242490 | 10/1991 | United Kingdom . | |
| 2242492 | 10/1991 | United Kingdom . | |
| 2242493 | 10/1991 | United Kingdom . | |

*Primary Examiner*—Robert J. Oberleitner
*Assistant Examiner*—Peter M. Poon
*Attorney, Agent, or Firm*—Brooks & Kushman

[57] ABSTRACT

Method and system for reducing the brake pressure rise rate under low Mu braking surface conditions by utilizing a vehicle reference speed to determine if the wheels are being over-braked. When over-braking occurs, the pressure rise rate is restricted by not allowing an ABS valve to go into an Apply state (approximately 100 psi/sec.), regardless of wheel acceleration levels. A Ramp state is used in place of the Apply state and the pressure rise is therefore limited to approximately 30 psi/sec. to improve wheel control. The Ramp duty cycle is also modified to provide the smallest pressure steps possible with the current valve hardware.

8 Claims, 3 Drawing Sheets

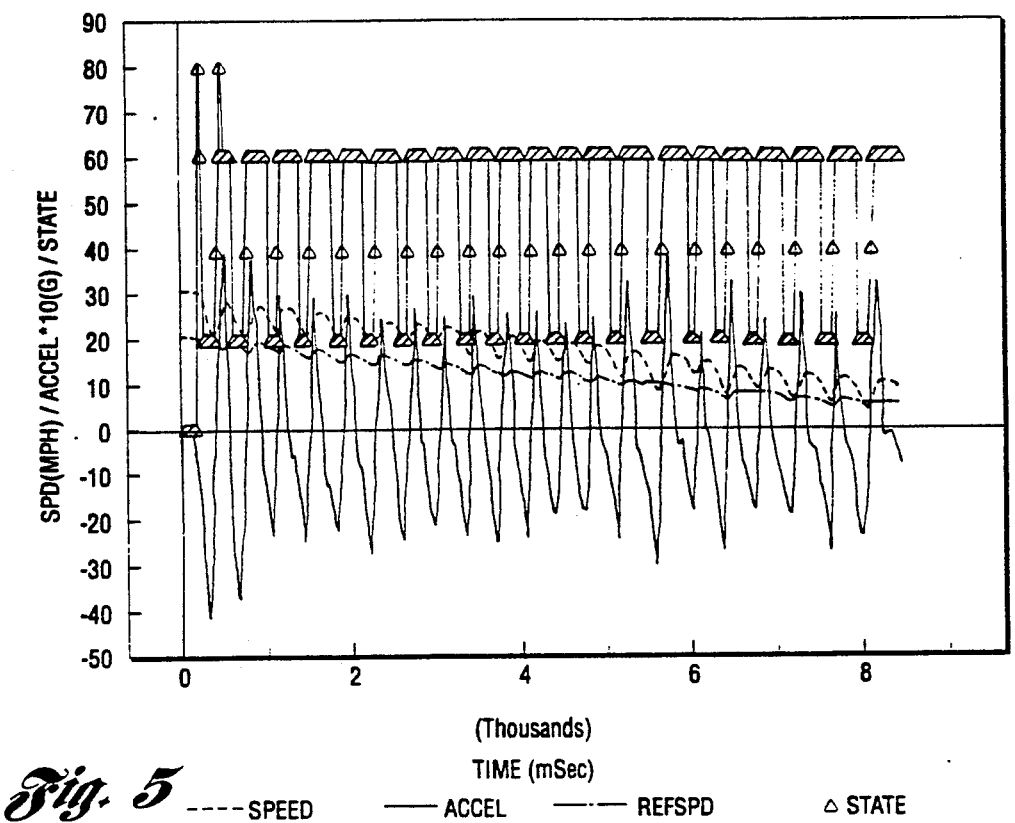
Fig. 5 ---- SPEED —— ACCEL —·— REFSPD △ STATE
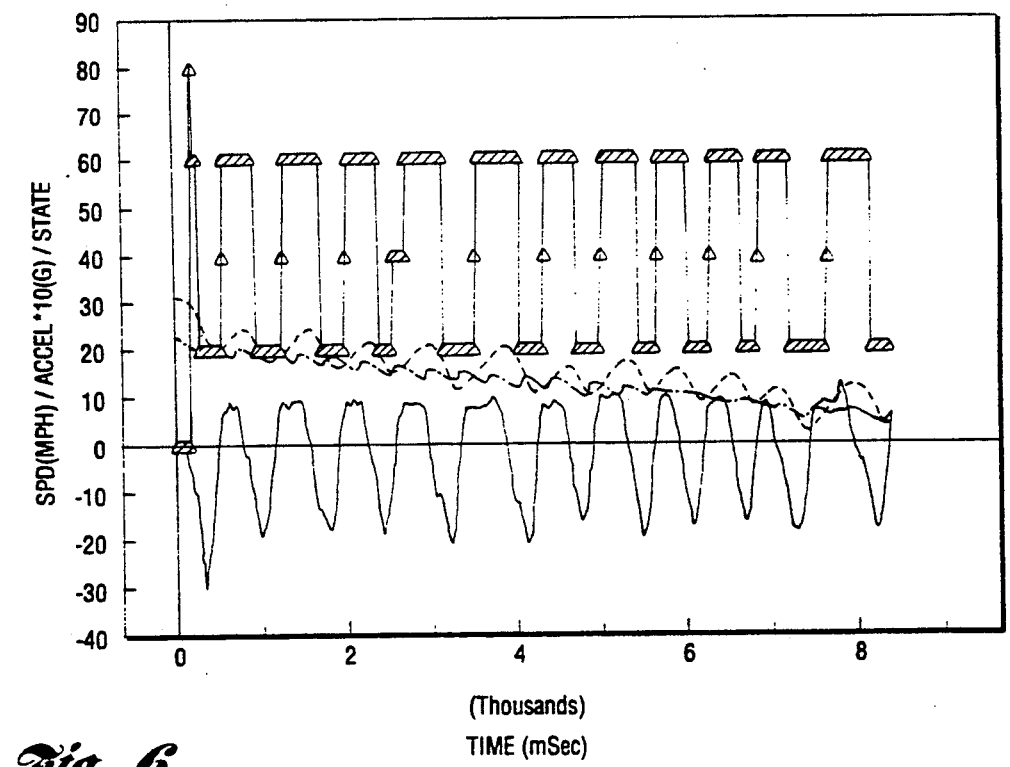
Fig. 6 ---- SPEED —— ACCEL —·— REFSPD △ STATE

METHOD AND SYSTEM FOR CONTROLLING BRAKE PRESSURE UNDER LOW MU BRAKING SURFACE CONDITIONS IN A VEHICULAR ABS

TECHNICAL FIELD

This invention relates to a control method and system for use in a vehicular ABS which compensates for low Mu braking surfaces.

BACKGROUND ART

Because truck brakes are designed to have the capacity of stopping a vehicle loaded to 20,000 lbs. per axle, they are extremely over-braked while operating empty on slippery roads. Even with ABS operation under these conditions small changes in brake pressure can have a large effect on wheel deceleration and may cause the wheels to be over-braked.

The wheel speed shown in FIG. 1 indicates the effect of this over-braking. Wheel speed control to the reference speed is very poor, producing vehicle stability problems and long stopping distances.

The Y-axis is a multiple scale axis which represents speed in MPH, acceleration in units of g's ($\times 10$), and numeric value of the ABS logic state. As the logic state on the Y-axis increases, the brake pressure rise rate increases. The X-axis is real time shown in milliseconds, usually ranging from 0 to 6. The acquisition of data is automatically started by the occurrence of a wheel deceleration rate which exceeds the allowable limit, based on vehicle reference speed. The plot contains 0.25 seconds of data prior to the start of the ABS event.

There are four types of data plotted: wheel speed, wheel acceleration, vehicle reference speed and the ABS logic state. The wheel speed data can be identified by its typical cyclic behavior modulating between the actual vehicle speed and the vehicle reference speed. Wheel accelerations correspond to the changes in wheel speed. The reference speed is calculated by subtracting 4 mph from the highest wheel speed and then taking 80% of the result. The reference speed is then decreased at a rate of $-0.8$ g's until it is recalculated by a higher wheel speed, when data is received. The behavior of the reference speed is typically much less cyclic than the wheel speeds as noted in the plot. The logic states are plotted using triangular markers placed at the Y-axis position corresponding to the numeric value logic state.

Under ideal conditions the wheel speeds should be controlled to the reference speed. When the wheel speeds drop below the reference speed, vehicle stability is decreased. On the other hand, if the wheels remain above the reference speed, the stopping distance may increase. It is important to maintain an accurate reference speed so the proper decisions can be made in controlling the wheel speeds. This becomes a tradeoff of stopping distance because the wheel is free-rolling in order to establish the true vehicle speed.

The root of the control problem is typically in the control logic. Typical control logic can be found in the McNisch, Jr., U.S. Pat. No. 5,071,200. The data of FIG. 1 indicates that the ABS logic recognizes that the wheel is decelerating and signals the ABS valve to release brake pressure. Because of the response time of the brake system, the wheel is over-braked During the Release state, brake torque or pressure is reduced until the wheel starts to accelerate. The control logic then calls for a Hold state on brake pressure until the wheel speed reaches the vehicle reference speed. The wheel acceleration, at the time the wheel pressure exceeds the reference speed, determines how fast brake pressure will be reapplied.

The data further indicates high acceleration levels, up to 6 G's, which, according to the logic, calls for fast pressure application rates. The wheel is again over-braked and the process is repeated, creating an unstable system.

On a high Mu surface this would have been the proper logic for optimum stability and minimum stopping distances, but it does not work here. There are many variables which affect the wheel acceleration and, therefore, it can be misleading when used as the determining factor for brake pressure application rates.

This is a relatively complex problem because it has to be resolved without affecting the performance of the system on high Mu surfaces.

SUMMARY OF THE INVENTION

An object of the present invention is to provide a method and system for improving ABS performance by increasing vehicle stability and reducing stopping distances on very low Mu surfaces such as ice, without affecting performance on high Mu surfaces.

In carrying out the above object and other objects of the present invention, a method is provided for controlling brake pressure rise rate under low Mu braking surface conditions in a vehicular ABS. The vehicular ABS includes an ABS valve having variable pressure rise rates, the method includes the steps of monitoring the speed of the vehicle wheels and generating a vehicle reference speed based on the highest wheel speed of the vehicle. The method also includes the steps of decreasing the value of the vehicle reference speed over time and determining when the speed of one of the wheels is greater than the vehicle reference speed after the step of decreasing. The method further includes the steps of correcting the vehicle reference speed when the speed of the one of the wheels is greater than the vehicle reference speed and limiting the pressure rise rate when the speed of the one of the wheels is greater than the vehicle reference speed.

Preferably, the wheel is a front wheel of the vehicle. Also, preferably, the bleed rate is fixed.

Further in carrying out the above object and other objects of the present invention, a system is provided for carrying out each of the above method steps.

The objects, features and advantages are readily apparent from the following detailed description of the present invention when taken in connection with the accompanying drawings.

BRIEF DESCRIPTION OF THE DRAWING FIGURES

FIG. 5 is a graph of front wheel speed data for a vehicular ABS utilizing the method and system of the present invention; and FIG. 6 is a graph of right rear wheel speed data for a vehicular ABS also utilizing the method and system of the present invention.

BEST MODE FOR CARRYING OUT THE INVENTION

Figure 2:
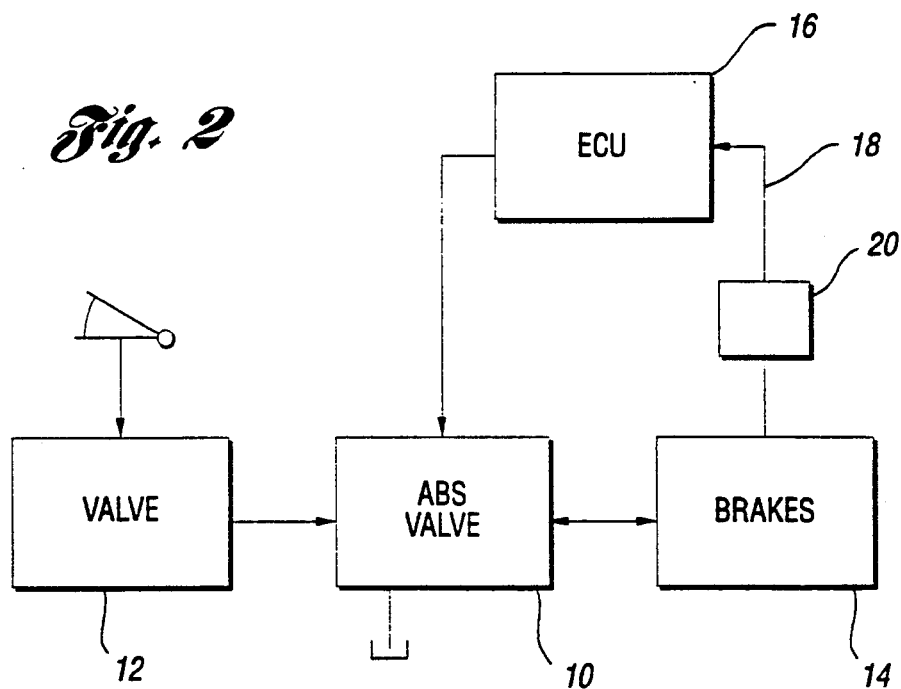
FIG. 2 is a block diagram schematic view of a vehicular ABS, generally of the type to which the method and system of the present invention apply.

Referring to FIG. 2 there is illustrated a vehicular ABS of the type including an ABS valve 10 connected in series between a treadle valve 12 and at least one fluid pressure operated vehicle brake actuator for applying and releasing vehicular brakes 14. The ABS valve 10 is controlled by an electronic control unit (E.C.U.) 16 which receives a rotational speed signal along line 18 from an ABS wheel speed sensor 20 associated with each vehicular brake 14. The sensor 20 may be generally of the type illustrated in U.S. Pat. No. 4,862,025 in the name of Dierker et al.

As illustrated in the above-noted U.S. Pat. No. 5,071,200, the control unit 16 determines a control parameter indicative of rotational acceleration of at least one vehicle wheel. The control unit 16 includes predetermined logic rules for processing the rotational speed signal and the acceleration control parameter and for issuing command output signals to the ABS valve.

The ABS valve 10 has a relatively fast fill position wherein substantially all pressurized fluid from treadle valve 12 is passed to the brake actuators 14. The ABS valve 20 also has a relatively slow fill position wherein a reduced modulated amount of pressurized fluid is passed to the brake actuators 14. Finally, the ABS valve 10 has an exhaust position wherein fluid pressure acting on the brake actuators 14 is exhausted to cause release of the vehicular brakes 14. The control unit 16 is effective upon sensing conditions indicative of an actual or incipient wheel-lock condition to cause the ABS valve 10 to assume the exhaust position.

In general, the ABS control logic within the control unit 16 is based on monitoring the wheel speeds. If a wheel is decelerating beyond a predetermined threshold, the brake pressure is reduced. Brake pressure is increased if the acceleration or speed is above predetermined threshold. Wheel speed information is obtained every 10 ms and wheel accelerations are then calculated. The logic then determines which of the four states of brake control, (APPLY, RAMP, HOLD, RELEASE) should be implemented and the corresponding duty cycle is output to the ABS valve 10.

The key to determining if an ABS system will be effective in maintaining vehicle stability is to insure that under conditions which induce the most extreme wheel deceleration rates, the ABS system is capable of controlling wheel speeds to the optimum level. This optimum level is called the reference speed and is generally agreed upon to be approximately 80% of the true vehicle speed.

Figure 3:
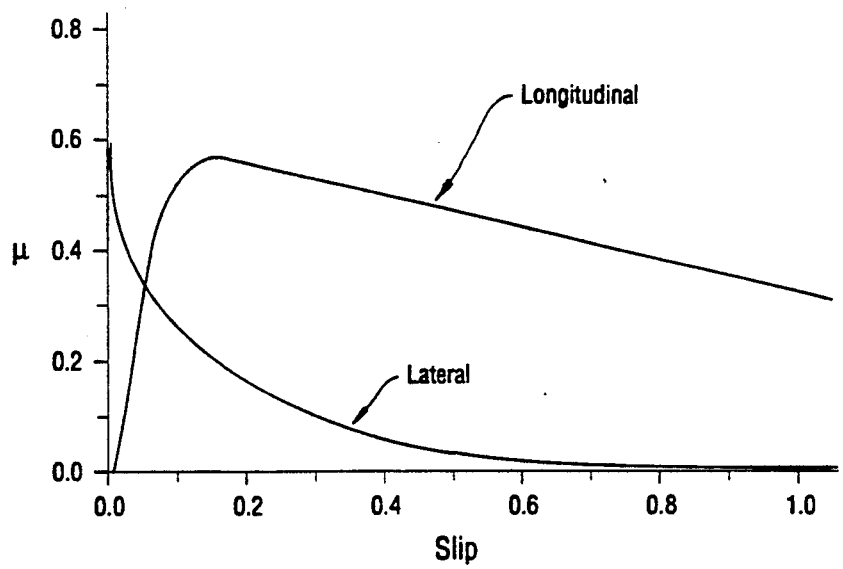
FIG. 3 is a graph of a typical Mu slip curve.

Shown in FIG. 3 is a typical $\mu$-slip curve for a rubber tire. It describes graphically the interface between the tires of a vehicle and the road. The lateral and longitudinal forces are given by $\mu N$ where N is the normal (vertical) force applied at each wheel. The purpose of ABS operation is to control wheel slip so as to keep the wheels at a desired operation point on the $\mu$-slip curve. Minimum stopping distance can be achieved by holding a value of wheel slip which corresponds to the peak of the $\mu$-slip curve. In most cases the stopping distances achieved will be shorter than if the wheels were allowed to lock. In the case of gravel and snow, stopping distances may be shorter when the wheels lock because the loose material "piles up" in front of the tires.

When wheel slip increases above zero, lateral stability is reduced and it would appear difficult to make the trade-offs between lateral and longitudinal stability. In practice when an ABS system holds wheel slip somewhere in the area of 15 to 20%, significant lateral stability can be retained.

As previously mentioned, an important aspect of the ABS control logic is the determination of the reference speed. If the reference speed is incorrectly determined, the wheels will be improperly braked, resulting in reduced vehicle stability or extending stopping distances. Since there are no additional vehicle speed inputs to the ABS ECU 16 other than the speed of the wheels being braked, the reference speed has to be determined by releasing the brakes 14 and allowing the wheels to roll back to the true vehicle speed.

Figure 4:
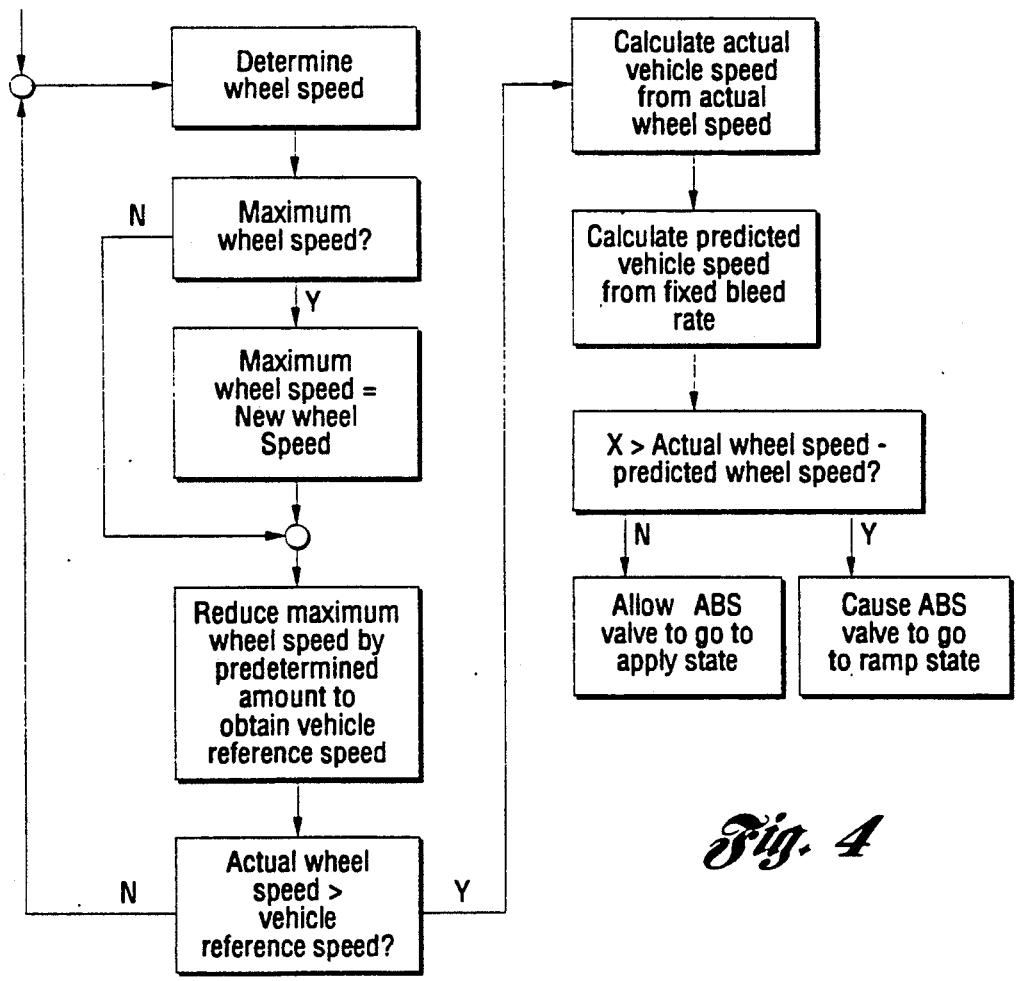
FIG. 4 is a block diagram flow chart illustrating the method and system of the present invention.

The principle of operation of the logic of the present method and system of the invention is illustrated in FIG. 4. The method and system use the front wheel reference speed to recognize that the vehicle is being over-braked on a low Mu surface. The front wheel speeds are used as the reference speed for a number of reasons. First, they are always loaded from the normal forces of the engine and cab. Secondly, because of the reduced mass and lower inertia when compared to drive axle speeds, they roll back to true vehicle speed faster than drive axle wheels if they are over-braking.

During ABS operation wheel speed information is received every 10 ms. The vehicle reference speed is predicted from the highest known wheel speed or the value of the previously known highest wheel speed which is continuously being reduced at a rate of $-0.8$ g's until an actual wheel speed is measured above this value.

During braking on a low Mu surface the wheel decelerates faster than $-0.8$ g's, but the true vehicle speed does not. Therefore, when the brakes are released and the wheel rolls back up to the true vehicle speed, the predicted vehicle speed is found to be in error and a correction is made which causes the vehicle reference speed to be stepped up by x amount. The amount x is equal to the error between the vehicle speed calculated from the actual wheel speed and the predicted vehicle speed.

When x exceeds some predetermined value (i.e. typically 2 or 3 mph) the brake pressure rise rate is restricted which reduces the over-braking and improves the ABS control. The brake pressure rise rate is a factor of many variables including the amount of treadle pressure the driver is supplying. The logic of the present invention compensates for this because it uses the actual wheel speed behavior to determine over-braking. This logic does not affect operation on high Mu braking surfaces because the predicted and actual vehicle reference speeds do not differ by more than the x amount.

Figure 1:
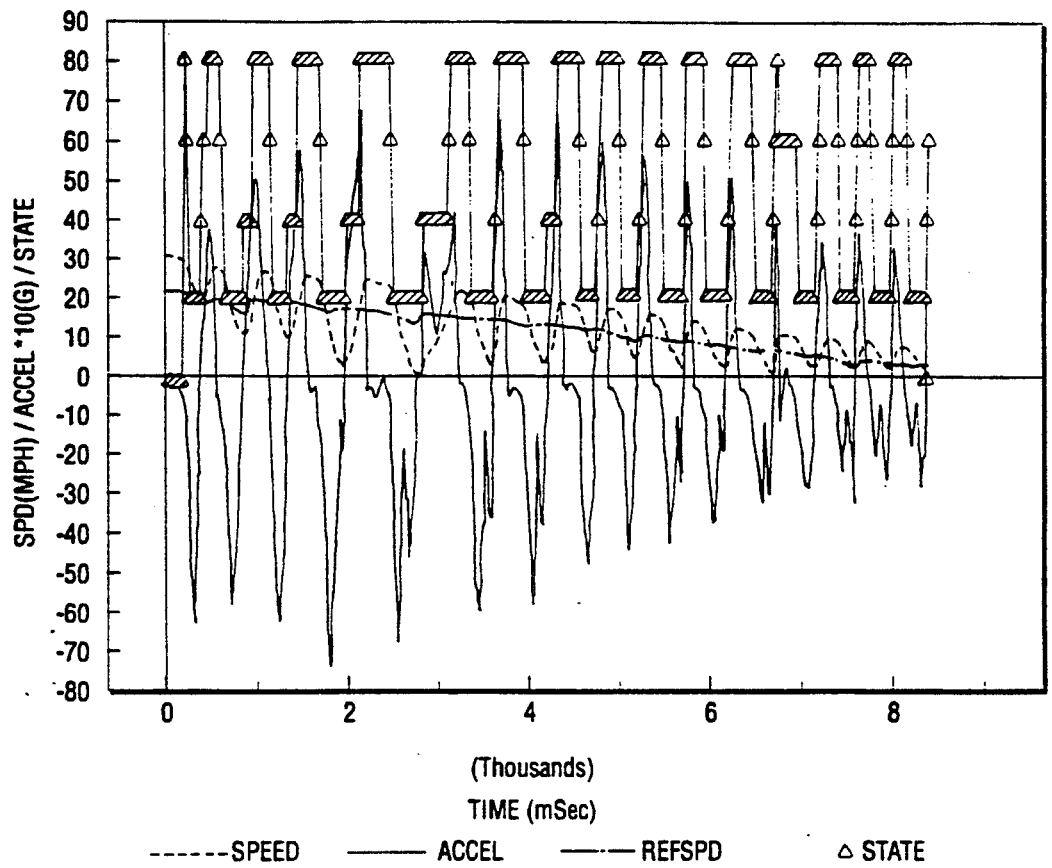
FIG. 1 is a graph of wheel speed data which indicates the effects of over-braking.

Referring now to FIGS. 5 and 6 (which are similar in form to FIG. 1) there is graphically illustrated wheel speed data which indicate excellent wheel speed control through the use of the present invention. From the data it is evident that after the first wheel speed dip the Apply state limits brake pressure rise rates to obtain this type of wheel behavior.

While a preferred embodiment of the subject invention has been shown and described in detail, those skilled in this art will recognize various alternative designs and embodiments for practicing the present invention as defined by the following claims.

What is claimed is:

1. In a vehicle, a method for controlling a brake pressure rise rate under low Mu braking surface conditions in a vehicular ABS, including an ABS valve to control the brake pressure rise rate, the method comprising the steps of:

monitoring the speed of the vehicle wheels;

generating a vehicle reference speed based on the highest wheel speed of the vehicle;

decreasing the value of the vehicle reference speed over time;

determining when the speed of one of the wheels is greater than the vehicle reference speed after the step of decreasing;

correcting the vehicle reference speed when the speed of the one of the wheels is greater than the vehicle reference speed; and limiting the brake pressure rise rate when the speed of the one of the wheels is greater than the vehicle reference speed by a predetermined amount.

2. The method as claimed in claim 1 wherein the wheels of the vehicle include a front wheel of the vehicle.

3. The method as claimed in claim 1 wherein the value of the vehicle reference speed is decreased at a relatively constant rate.

4. The method as claimed in claim 3 wherein the relatively constant rate is approximately 0.8 g per second.

5. A system for controlling a brake pressure rise rae under low Mu braking surface conditions in a vehicular ABS including an ABS valve to control the brake pressure rise rate, the system comprising:

means for monitoring the speed of the vehicle's wheels;

means for generating a vehicle reference speed based on the highest wheel speed of the vehicle;

means for decreasing the value of the vehicle reference speed over time;

means for determining when the speed of one of the wheels is greater than the reference speed after the value of the vehicle reference speed has been decreased;

means for correcting the vehicle reference speed when the speed of the one of the wheels is greater than the vehicle reference speed; and means for limiting the brake pressure rise rate when the speed of the one of the wheels is greater than the vehicle reference speed by a predetermined amount.

6. The system as claimed in claim 5 wherein the wheels of the vehicle include a front wheel of the vehicle.

7. The system as claimed in claim 5 or claim 6 wherein the value of the vehicle reference speed is decreased at a relatively constant rate.

8. The system as claimed in claim 7 wherein the relatively constant rate is approximately 0.8 g per second.

* * * * *